W. F. MANNEY.
PIPE VISE.
APPLICATION FILED APR. 12, 1915.

1,198,365.

Patented Sept. 12, 1916.

WITNESSES:

INVENTOR
Walter F. Manney
BY
ATTORNEY

UNITED STATES PATENT OFFICE.

WALTER F. MANNEY, OF SEATTLE, WASHINGTON.

PIPE-VISE.

1,198,365.  Specification of Letters Patent.  Patented Sept. 12, 1916.

Application filed April 12, 1915. Serial No. 20,961.

*To all whom it may concern:*

Be it known that I, WALTER F. MANNEY, a citizen of the United States, residing at 6502 Tenth avenue northwest, Seattle, in the county of King and State of Washington, have invented a new and useful Improvement in Pipe-Vises, of which the following is a specification.

This invention relates to improvements in pipe vises and the object of this improvement is to provide a strong and simply constructed pipe vise that is reliable in operation and that may quickly and easily be engaged with or disengaged from a pipe and further to provide a pipe vise that is automatically self-adjusting to pipes of a different size.

The invention consists in the novel construction, adaptation and combination of the various parts of a pipe vise as will be more clearly described in the following specification, illustrated in the accompanying drawings and finally pointed out in the appended claim.

Figure 1:
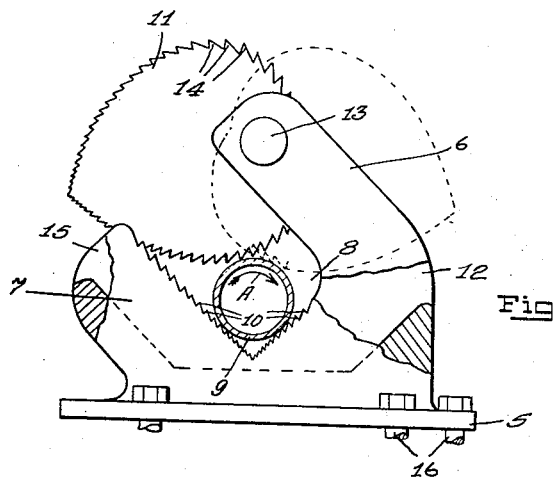
Figure 2:
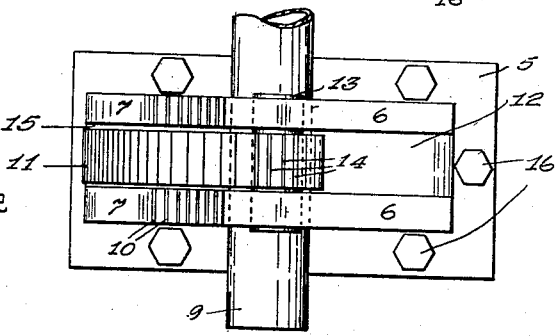

Referring to the drawings Figure 1 illustrates by a view in side elevation my pipe vise as it may appear when a pipe is placed therein for cutting or threading; Fig. 2, is a plan view of the same.

Like reference numerals indicate like parts throughout the accompanying drawings.

Referring to Figs. 1 and 2, the numeral 5 indicates a base plate that is provided with an integrally formed vise frame consisting in two angular, outwardly projecting members 6 and 7 that are spaced apart to form a substantially rectangular shaped opening 8 adapted to receive a pipe 9 and having one side and one end thereof provided with teeth 10 that are graduated in size to form an angular pipe gripping jaw the smaller teeth being adjacent to the intersection of the two sides of such jaw whereby a pipe of small diameter may be more securely gripped. 11 is a heart shaped cam that is disposed within a slot 12 in the member 6 and is mounted on a pivot 13 whereby it may be turned to any desired position within the slot 12. The edge of the cam 11 is provided with teeth 14 that are descendingly graduated in size from the larger top portion of such cam to the point thereof and are adapted to co-act with the teeth 10 to grip the pipe 9, and the point of the cam 11 is adapted to move in a slot 15 in the member 7 when such cam is rotated about the pivot 13. The base plate 5 may be secured to any suitable support by bolts 16 and the pipe 9 which may be any size less than the width of the opening 8 may be inserted in such opening and the cam 11 allowed to drop downwardly by its own weight onto such pipe as clearly shown in Fig. 1. If a force is then exerted on the pipe 10 tending to turn it in the direction indicated by the arrow A the cam 11 will be caused to bear downwardly on such pipe, and the teeth 14 on the cam and the teeth 10 on the end of the pipe jaw will engage with such pipe to prevent it from turning, the greater the turning force exerted on the pipe the more securely will such pipe be held by the cam 11. If it is desired to hold the pipe against a force tending to turn it in a direction opposite to that indicated by the arrow A then the heart shaped cam 11 will be thrown over into the position shown by broken lines in Fig. 1, to cause the teeth on the opposite side of said cam to engage with pipe 10 and resist turning in such opposite direction. It will be readily understood from an inspection of the drawing that the cam 11 is so formed that the fine teeth 14 near the point thereof and the corresponding fine teeth 15 near the intersection of the angular jaw faces will be caused to engage with pipes of smaller diameter securely to hold them while the larger teeth 10 and 14 will engage in a similar manner with pipes of larger diameter. By this form of tooth graduation a vise may be constructed so that each different size of pipe is engaged by teeth of a size best adapted to grip it, the fine teeth for small pipe being so positioned that they cannot be made to engage with heavy pipe and be broken or dulled thereby and the larger teeth being made heavier and stronger and being so positioned that they can not be used on smaller pipes.

It will be understood that numerous changes in the form and arrangement of the various parts embodied in this device may be resorted to without departing from the spirit of the invention or sacrificing any of its advantages.

What I claim and desire to secure by Letters Patent is:

A pipe vise of the class described comprising a frame having two outwardly projecting slotted elements that are spaced apart to form an angular pipe gripping jaw, teeth provided on the angular faces of said pipe gripping jaw said teeth being descendingly graduated in size from the outer portions to the point of intersection of the angular faces of said jaw, and a double faced cam pivotally mounted in a slot in one of said frame elements said cam having teeth descendingly graduated in size from the outer portions to the point thereof that are adapted automatically to co-act with the teeth on said gripping jaw to grip pipes of a different size.

WALTER F. MANNEY.

Witnesses:
Jos. L. Reed,
E. B. Herald.